(12) United States Patent
Kochiya

(10) Patent No.: US 10,744,877 B2
(45) Date of Patent: *Aug. 18, 2020

(54) IMAGE DISPLAY DEVICE

(71) Applicant: Toyota Jidosha Kabushiki Kaisha, Toyota-shi, Aichi-ken (JP)

(72) Inventor: Takumi Kochiya, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/864,652

(22) Filed: Jan. 8, 2018

(65) Prior Publication Data

US 2018/0222320 A1 Aug. 9, 2018

(30) Foreign Application Priority Data

Feb. 8, 2017 (JP) .................................. 2017-021267

(51) Int. Cl.
*H04N 7/18* (2006.01)
*B60K 35/00* (2006.01)
(Continued)

(52) U.S. Cl.
CPC ............... *B60K 35/00* (2013.01); *B60R 1/00* (2013.01); *G06T 7/50* (2017.01); *G06T 7/70* (2017.01);
(Continued)

(58) Field of Classification Search
CPC .. B60K 35/00; B60K 2350/2013; G06T 7/50; G06T 7/70; G06T 11/60; G06T 2207/30252; B60R 1/00; B60R 2001/1215; B60R 2300/30; B60R 2300/8066; H04N 7/18
(Continued)

(56) References Cited

U.S. PATENT DOCUMENTS

| 10,259,325 B2 * | 4/2019 | Fujisaki .................... G06T 7/50 |
| 2002/0017985 A1 | 2/2002 | Schofield et al. |

(Continued)

FOREIGN PATENT DOCUMENTS

| DE | 69618192 T2 | 7/2002 |
| JP | 2001197482 A | 7/2001 |

(Continued)

*Primary Examiner* — Michael Lee
(74) *Attorney, Agent, or Firm* — Dinsmore & Shohl LLP

(57) ABSTRACT

An image display device includes: a camera that takes a rear-view image; a rear-view-image display unit including a mirror surface and a display for displaying the rear-view image; a distance obtainer that obtains a distance between a vehicle and a following vehicle; a cutout-image creator that cuts out a cutout image from the taken rear-view image based on a view-angle value; and a display controller that creates, based on the cutout image, a display image matching a size of a display region of the display and controls the display to display the created display image. The cutout-image creator is configured to, based on the obtained distance, determine the view-angle value to such a view-angle value that a size of the following vehicle to be displayed on the display image is equal to a size of the following vehicle that is to reflect in the mirror surface.

13 Claims, 10 Drawing Sheets

(51) Int. Cl.
*G06T 7/70* (2017.01)
*G06T 11/60* (2006.01)
*B60R 1/00* (2006.01)
*G06T 11/00* (2006.01)
*G06T 7/50* (2017.01)
*B60R 1/12* (2006.01)

(52) U.S. Cl.
CPC ............ *G06T 11/00* (2013.01); *G06T 11/60* (2013.01); *B60K 2370/173* (2019.05); *B60K 2370/179* (2019.05); *B60K 2370/21* (2019.05); *B60K 2370/23* (2019.05); *B60K 2370/777* (2019.05); *B60R 2001/1215* (2013.01); *B60R 2300/30* (2013.01); *B60R 2300/8066* (2013.01); *G06T 2207/30252* (2013.01); *H04N 7/18* (2013.01)

(58) Field of Classification Search
USPC ........................................................ 348/148
See application file for complete search history.

(56) References Cited

U.S. PATENT DOCUMENTS

| | | | |
|---|---|---|---|
| 2009/0079553 A1* | 3/2009 | Yanagi | B60R 1/00 340/435 |
| 2009/0079585 A1* | 3/2009 | Chinomi | B60R 1/00 340/901 |
| 2012/0140074 A1 | 6/2012 | Taguchi et al. | |
| 2012/0274737 A1 | 11/2012 | Kuboyama et al. | |
| 2016/0375833 A1 | 12/2016 | Larson et al. | |
| 2017/0021770 A1 | 1/2017 | Arai et al. | |
| 2017/0259743 A1* | 9/2017 | Uchimura | B60R 1/00 |
| 2018/0197411 A1* | 7/2018 | Shimizu | B60K 35/00 |

FOREIGN PATENT DOCUMENTS

| | | |
|---|---|---|
| JP | 2008301091 A | 12/2008 |
| JP | 2009075988 A | 4/2009 |
| JP | 2009078597 A | 4/2009 |
| JP | 2012-116357 A | 6/2012 |
| JP | 5938703 B2 | 6/2016 |
| JP | WO2016042713 A1 | 6/2017 |

* cited by examiner

IMAGE DISPLAY DEVICE

CROSS REFERENCE TO RELATED APPLICATION

The present application claims priority from Japanese Patent Application No. 2017-021267, which was filed on Feb. 8, 2017, the disclosure of which is herein incorporated by reference in its entirety.

BACKGROUND

The following disclosure relates to an image display device including a display mounted in a passenger compartment and configured to control the display to display an image representing a view behind a vehicle.

There is known an image display device including a display mounted in a passenger compartment and configured to control the display to display an image taken by a camera and representing a view behind a vehicle. Patent Document 1 (Japanese Patent Application Publication No. 2012-116357) discloses an image display device in which a half mirror is provided between a first display and a second display, and an image displayed on the first display and an image displayed on the second display are projected onto the half mirror. In this image display device, the two images projected on the half mirror overlap each other with displacement, thereby giving a sense of depth to an image viewed by a driver when the driver views the half mirror.

SUMMARY

In the above-described image display device, the camera is mounted at a rear of an optical inner mirror in a front and rear direction (a longitudinal direction) of the vehicle. Thus, the size of a display object displayed on the display may differ from that of the display object reflecting in the optical inner mirror, depending upon a distance between the camera and the display object located behind the vehicle. Thus, when viewing the image displayed on the display, the driver sometimes has difficulty in grasping a sense of distance between the vehicle and the display object.

Accordingly, an aspect of the disclosure relates to an image display device capable of reducing a difference between the size of a display object displayed on a display and the size of a display object reflecting in an optical inner mirror to reduce difficulty for a driver viewing the display in grasping a sense of distance between a vehicle and a display object.

In one aspect of the disclosure, an image display device, comprises:
a camera configured to take an image representing a view behind a vehicle;
a rear-view-image display unit comprising (i) a mirror surface configured to reflect a view behind the vehicle and (ii) a display configured to display at least a portion of a rear-view image taken by the camera;
a distance obtainer configured to obtain a vehicle-to-vehicle distance between the vehicle and a following vehicle located behind the vehicle;
a cutout-image creator configured to cut out a cutout image based on a view-angle value, the cutout image being a portion of the rear-view image taken by the camera, the view-angle value indicating a size of the cutout image with respect to a size of the rear-view image; and
a display controller configured to create a display image based on the cutout image such that the display image matches a size of a display region of the display, the display controller being configured to control the display to display the created display image on the display region of the display,
wherein the cutout-image creator is configured to, based on the vehicle-to-vehicle distance obtained by the distance obtainer, determine the view-angle value to such a view-angle value that a size of the following vehicle to be displayed on the display image is equal to a size of the following vehicle that is to reflect in the mirror surface.

In another aspect of the disclosure, an image display device comprises:
a camera configured to take an image representing a view behind a vehicle;
a rear-view-image display unit comprising a display configured to display at least a portion of a rear-view image taken by the camera;
a distance obtainer configured to obtain a vehicle-to-vehicle distance between the vehicle and a following vehicle located behind the vehicle;
a cutout-image creator configured to cut out a cutout image based on a view-angle value, the cutout image being a portion of the rear-view image taken by the camera, the view-angle value indicating a size of the cutout image with respect to a size of the rear-view image; and
a display controller configured to create a display image based on the cutout image such that the display image matches a size of a display region of the display, the display controller being configured to control the display to display the created display image on the display region of the display,
wherein the cutout-image creator is configured to determine the view-angle value such that a view-angle value taken when the vehicle-to-vehicle distance obtained by the distance obtainer is a first distance is greater than a view-angle value taken when the vehicle-to-vehicle distance is second distance that is greater than the first distance.

There will be described by way of examples forms of aspects of the present disclosure. The forms are numbered like the appended claims and depend from another form or forms, where appropriate, for easy understanding of the present disclosure. It is to be understood that combinations of features of the present disclosure are not limited to those of the following forms. That is, the aspects of the present disclosure are to be construed by taking account of, e.g., the description following each form, the description of the embodiments, and conventional techniques, and as long as the aspects of the present disclosure are constructed in this way, any one of the following forms may be implemented with one or more features added, or one or more of a plurality of features included in any one of the following forms are not necessarily provided all together.

(1) An image display device, comprising:
a camera configured to take an image representing a view behind a vehicle;
a rear-view-image display unit comprising (i) a mirror surface configured to reflect a view behind the vehicle and (ii) a display configured to display at least a portion of a rear-view image taken by the camera;
a distance obtainer configured to obtain a vehicle-to-vehicle distance between the vehicle and a following vehicle located behind the vehicle;
a cutout-image creator configured to cut out a cutout image based on a view-angle value, the cutout image being a portion of the rear-view image taken by the camera, the view-angle value indicating a size of the cutout image with respect to a size of the rear-view image; and
a display controller configured to create a display image based on the cutout image such that the display image matches a size of a display region of the display the display controller being configured to control the display to display the created display image on the display reion of the display,
wherein the cutout-image creator is configured to, based on the vehicle-to-vehicle distance obtained by the distance obtainer, determine the view-angle value to such a view-angle value that a size of the following vehicle to be displayed on the display image is equal to a size of the following vehicle that is to reflect in the mirror surfaces.

In the case where the camera is provided at a rear of the mirror surface, the distance between the camera and the following vehicle is less than the distance between the mirror surface and the following vehicle. Also, a portion of the rear-view image taken by the camera is cut out based on the view-angle value, and the cutout image is displayed on the display so as to match the size of the display. Thus, some image-cutout angle values cause the size of the following vehicle displayed on the display to differ from the size of the following vehicle that is to reflect in the mirror surface, in the state in which the following vehicle is spaced apart from the vehicle at the vehicle-to-vehicle distance. The size of the following vehicle displayed on the display is determined by a ratio between the size or the following vehicle in the cutout image and the size of the cutout image. That is, the size of the following vehicle displayed on the display is determined by the view-angle value that determines the size of the cutout image. Also, the difference between the size of the following vehicle displayed on the display and the size of the following vehicle that is to reflect in the mirror surface varies by the vehicle-to-vehicle distance. In the image display device, the cutout-image creator, based on the vehicle-to-vehicle distance, determines the view-angle value that establishes a state in which the size of the following vehicle displayed on the display is equal to the size of the following vehicle that is to reflect in the mirror surface. This configuration reduces the difference between the size of the following vehicle displayed on the display and the size of the following vehicle that is to reflect in the mirror surface, making it possible to reduce difficulty for a driver in grasping a sense of distance between the vehicle and the following vehicle.

(2) The image display device according to the above form (1),
wherein the display is formed on the mirror surface,
wherein the mirror surface comprises: a first mirror surface portion formed on a surface of the display; and a second mirror surface portion disposed around the first mirror surface portion, and
wherein the rear-view-image display unit is switchable between (i) a mirror-surface showing state in which the view behind the vehicle reflects in the first mirror surface portion and the second mirror surface portion and (ii) a display showing state in which the view behind the vehicle is displayed on the display.

A display state of the rear-view-image display unit is selectively switcheable to one of the display showing state and the mirror-surface showing state. In the image display device, the view-angle value is adjusted such that the size of the following vehicle displayed on the display is equal to the size of the following vehicle reflecting in the mirror surface.

(3) The image display device according to the above form (2),
wherein the view-angle value that establishes a state in which a size of the following vehicle displayed in the display showing state and a size of the following vehicle that is to reflect in the mirror surface showing state is determined based on the vehicle-to-vehicle distance,
wherein the cutout-image creator is configured to determine the view-angle value based on the vehicle-to-vehicle distance obtained by the distance obtainer and create the cutout image based on the determined view-angle value.

In the image display device configured as described above, the cutout-image creator obtains the vehicle-to-vehicle distance and thereby determines the view-angle value that establishes the state in which the size of the following vehicle displayed in the display showing state is equal to the size of the following vehicle that is to reflect in the mirror-surface showing state. This view-angle value may be determined by calculating a relative relationship between a preset vehicle-to-vehicle distance and each of the view-angle values and then using the obtained vehicle-to-vehicle distance to select one of the view-angle values. Alternatively, the view-angle value may be determined by calculation each time when the vehicle-to-vehicle distance is obtained.

(4) The image display device according to any one of the above forms (1) through (3), wherein the cutout-image creator is configured to, when the vehicle-to-vehicle distance obtained by the distance obtainer is less than or equal to a set value, determine the view-angle value to such a view-angle value that a size of the following vehicle to be displayed on the display is equal to the size of the following vehicle that is to reflect in the mirror surface.

(5) The image display device according to the above form (4), wherein the view-angle value increases with decrease in the vehicle-to-vehicle distance.

Assuming that the view-angle value is constant regardless of the vehicle-to-vehicle distance, a ratio between the size of the following vehicle that is to reflect in the mirror surface and the size of the following vehicle displayed on the display increases with decrease in the vehicle-to-vehicle distance. Accordingly, the configuration in which the view-angle value increases with decrease in the vehicle-to-vehicle distance can make the size of the following vehicle displayed on the display equal to the size of the following vehicle that is to reflect in the mirror surface.

(6) The image display device according to the above from (4), wherein the cutout-image creator is configured to, when the vehicle-to-vehicle distance obtained by the distance obtainer is greater than the set value, determine the view-angle value to a view-angle value greater than a first view-angle value that is such a view-angle value that the sue of the following vehicle to be displayed on the display is equal to the size of the following vehicle that is to reflect in the mirror surface when the vehicle-to-vehicle distance is equal to the set value.

In the image display device configured as described above, when the vehicle-to-vehicle distance is not less than or equal to the set value, the view-angle value is made greater than the first view-angle value such that the size of the following vehicle displayed on the display is less than the size of the following vehicle that is to reflect in the mirror surface when the vehicle-to-vehicle distance is equal to the set value. Accordingly, when the vehicle-to-vehicle distance is not less than or equal to the set value, the display can display a view behind the vehicle which is broader than that reflecting in the mirror surface.

(7) The image display device according to the above form (4),
wherein the cutout-image creator is configured to, when the vehicle-to-vehicle distance is greater than the set value, determine the view-angle value to a preset view-angle value greater than a first view-angle value that is such a view-angle value that the size of the following vehicle to be displayed on the display is equal to the size of the following vehicle that is to reflect in the mirror surface when the vehicle-to-vehicle distance is equal to the set value, and
wherein the preset view-angle value is constant regardless of the vehicle-to-vehicle distance.

In the image display device configured as described above, since the constant view-angle value greater than the first view-angle value is used for processing, it is possible to obtain a view behind the vehicle which is broader than that reflecting in the mirror surface.

(8) The image display device according to the above form (4), wherein the cutout-image create a is configured to, when the following vehicle is not detected, create the cutout image based on a preset view-angle value greater than a first view-angle value that is such a view-angle value that the size of the following vehicle to be displayed on the display is equal to the size of the following vehicle that is to reflect in the mirror surface when the vehicle-to-vehicle distance is equal to the set value.

In the image display device configured as described above, even in the case where the following vehicle is not detected, and the vehicle-to-vehicle distance is not obtained, the cutout image is created based on the set view-angle value that is greater than the first view-angle value. Accordingly, in the case where the following vehicle is not detected, it is possible to obtain a view behind the vehicle which is broader than that reflecting in the mirror surface.

(9) The image display device according to any one of the above forms (1) through (8), wherein the distance obtainer is configured to obtain, as the vehicle-to-vehicle distance, a vehicle-to-vehicle distance between the vehicle and the following vehicle nearest to the vehicle among a plurality of following vehicles located behind the vehicle.

In the image display device configured as described above, when the vehicle-to-vehicle distance between the vehicle driving on a certain lane and a following vehicle driving on a lane next to the certain lane is less than the vehicle-to-vehicle distance between the vehicle and a following vehicle driving on the certain lane, for example, the controller determines the view-angle value based on the vehicle-to-vehicle distance between the driving vehicle and the following vehicle driving on the lane next to the certain lane. Accordingly, when the vehicle makes a lane change to the next lane, for example, it is possible to reduce difficulty for the driver in grasping a distance between the vehicle and the following vehicle driving on the next lane.

(10) An image display device, comprising:
a camera configured to take an image representing a view behind a vehicle;
a rear-view-image display unit comprising a display configured to display at least a portion of a rear-view image taken by the camera;
a distance obtainer configured to obtain a vehicle-to-vehicle distance between the vehicle and a following vehicle located behind the vehicle;
a cutout-image creator configured to cut out a cutout image based on a view-angle value, the cutout image being a portion of the rear-view image taken by the camera, the view-angle value indicating a size of the cutout image with respect to a size of the rear-view image; and
a display controller configured to create a display image based on the cutout image such that the display image matches a size of a display region of the display, the display controller being configured to control the display to display the created display image on the display region of the display,
wherein the cutout-image creator is configured to determine the view-angle value such that a view-angle value taken when the vehicle-to-vehicle distance obtained by the distance obtainer is a first distance is greater than a view-angle value taken when the vehicle-to-vehicle distance is second distance that is greater than the first distance.

The size of the following vehicle displayed on the display is determined based on the view-angle value in a state in which the following vehicle is spaced apart from the vehicle at the vehicle-to-vehicle distance. While the present image display device does not include an inner mirror constituted by the mirror surface, the size of the following vehicle displayed on the display is in some cases different from the size of the following vehicle that is to reflect in the mirror surface, depending upon the view-angle value. Thus, in the case where the view-angle value is constant, the driver has difficulty in grasping to sense of distance between the vehicle currently driving and the following vehicle. In particular, when the following vehicle is located near the vehicle, that is, when each of the first distance and the second distance is a small value, the size of the following vehicle displayed on the display is in some cases greater than the size of the following vehicle that is to reflect in the mirror surface. In the image display device, the cutout-image creator determines the view-angle value such that the view-angle value taken when the vehicle-to-vehicle distance is the first distance is greater than the view-angle value taken when the vehicle-to-vehicle distance is second distance that is greater than the first distance. That is, the view-angle value increases with decrease in the vehicle-to-vehicle distance. When the vehicle-to-vehicle distance is the first distance, the size of the cutout image increases with increase in the view-angle value, and the size of the following vehicle in the cutout image with respect to the cutout image decreases with increase in the view-angle value. That is, the size of the following vehicle displayed on the display decreases with increase in the view-angle value. Accordingly, when the vehicle-to-vehicle distance is the first distance, the display displays the display image created based on the view-angle value that is greater than the view-angle value taken when the vehicle-to-vehicle distance is the second distance. In particular, in the case where each of the first distance and the second distance is a small value, the size of the following vehicle displayed on the display becomes small, resulting in a reduced difference between the size of the following vehicle displayed on the display and the size of the following vehicle that is to reflect in the mirror surface. Accordingly, the driver can easily grasp a sense of distance between the vehicle and the following vehicle.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

Hereinafter, there will be described embodiments by reference to the drawings.

Figure 1:
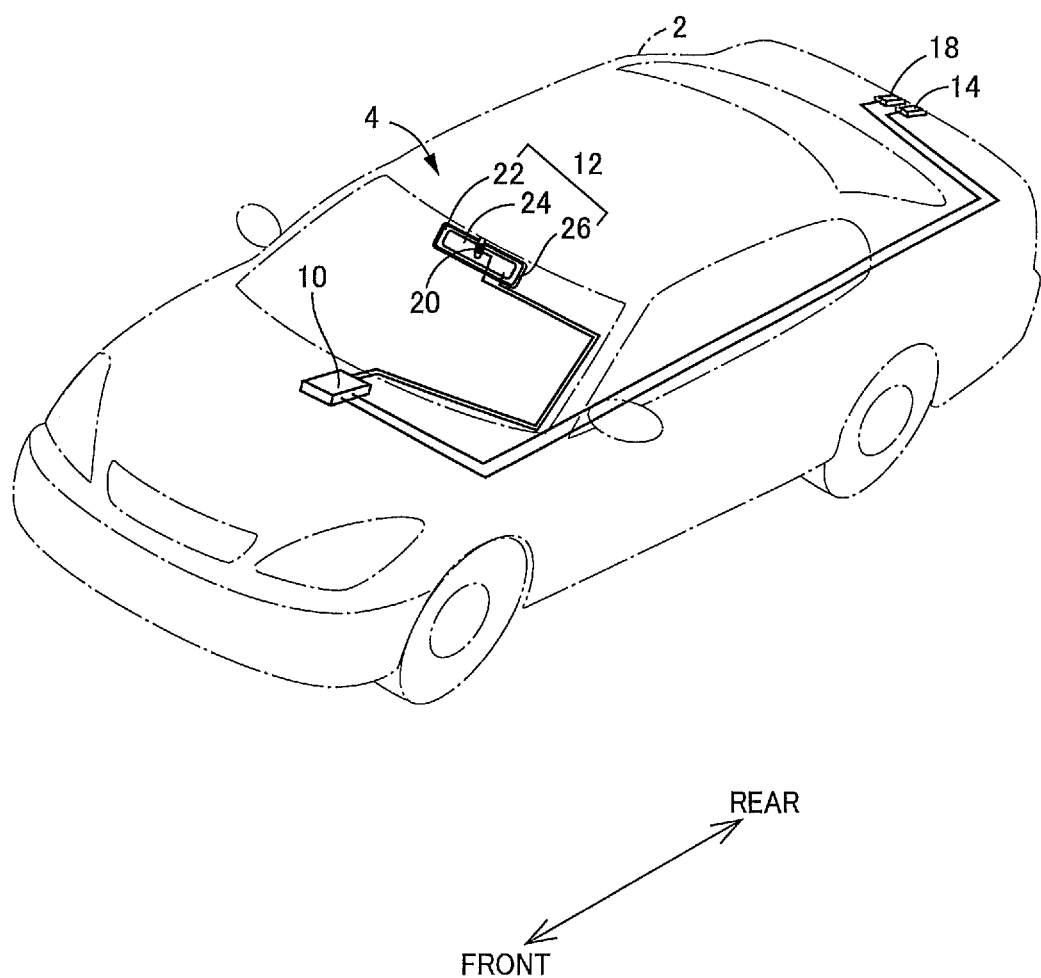
FIG. 1 is a view illustrating an overall construction of a vehicle installed with an image display device according to a first embodiment.
Figure 2:
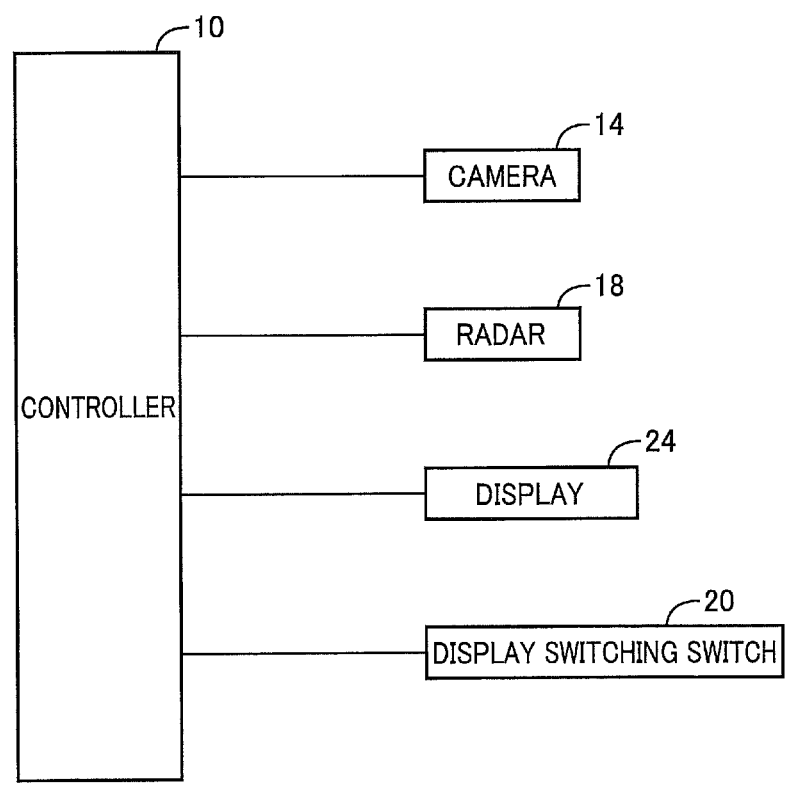
FIG. 2 is a schematic view illustrating electric connection of a controller in the first embodiment.

FIG. 1 is a view of a vehicle 2 installed with an image display device 4 according to a first embodiment. FIG. 2 is a schematic view of an overall configuration of the image display device 4 according to the first embodiment. As illustrated in FIG. 1, the image display device 4 installed on the vehicle 2 includes a controller 10, a rears de display device 12, a camera 14, a radar 18, and a display switching switch 20. As illustrated in FIG. 1, the front and rear direction is defined with respect to the direction of travel of the vehicle 2.

The controller 10 includes a central processing unit (CPU), a ROM, an EEPROM, a RAM, various integrated circuits (ICs), and communication interfaces. The CPU executes various kinds of control by executing programs stored in the ROM. Devices communicably connected to the controller 10 include the camera 14, the radar 18, the display switching switch 20, and a display 24 which will be described below. The controller 10 cuts out a portion of an image taken by the camera 14, creates a display image, and displays the created display image on the display 24. This image cutout processing for cutting out a portion of the taken image is executed each time when a predetermined length of time is elapsed after the controller 10 has received an ON signal from the display switching switch 20. The image cutout processing will be described later in detail.

The rear-side display device 12 is mounted on a roof portion defining a passenger compartment. The rear-side display device 12 is disposed in front of a driver's seat and between the driver's seat and an assistant-driver's seat. The rear-side display device 12 includes a mirror surface 22, the display 24, and a frame 26. The mirror surface 22 has substantially the same size as the frame 26 and is fitted in the frame 26. The mirror surface 22 reflects a view behind the vehicle 2. The display 24 is formed in a portion of the mirror surface 22. The display 24 is smaller in size than the mirror surface 22 and disposed at substantially the center of the mirror surface (see FIG. 3C). That is, the mirror surface 22 includes: a mirror surface portion 24a formed on a surface of the display 24; and a mirror surface portion 22a located around the display 24. The display 24 displays the display image created by the controller 10.

In a state in which the display 24 is not operated, each of the mirror surface portion 24a and the mirror surface portion 22a serves as an optical mirror (a mirror-surface showing state). In a state in which the display 24 is being operated, the image is displayed on the display 24 and viewable by a driver (a display showing state).

The camera 14 is provided on a rear end portion of the roof portion of the vehicle 2 or on a rear end portion of the vehicle 2 to at least take an image in a visible light region. One example of the camera 14 is a charge-coupled device (CCD) camera. The camera 14 takes an image representing a view behind the vehicle 2 and creates image data based on the image. The camera 14 transmits the created image data to the controller 10. The image taken by the camera 14 contains a lane and following vehicles behind the vehicle 2, for example. The radar 18 is disposed on the rear end portion of the vehicle to detect objects near the vehicle. One example of the radar 18 is a millimeter-wave radar configured to radiate millimeter waves to surroundings of the vehicle to detect objects around the vehicle. The radar 18 detects a distance between the detected object and the vehicle and detects a position and a speed of the detected object relative to the vehicle. The radar 18 transmits a signal to the controller 10 in accordance with the detected values. In the present embodiment, the radar 18 detects a distance between the vehicle 2 and the following vehicle located or driving behind the vehicle 2.

The display switching switch 20 is provided at the frame 26.

Figure 3A:
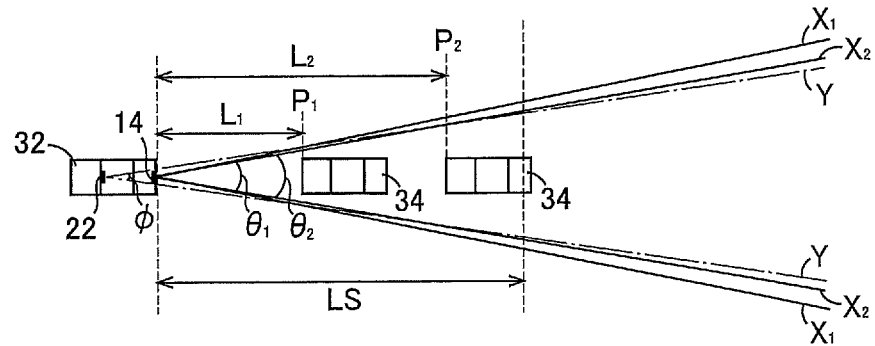
FIG. 3A is a view of an own vehicle and following vehicles running on a rear side of the own vehicle, with the own vehicle and the following vehicles viewed from above.
Figure 3B:
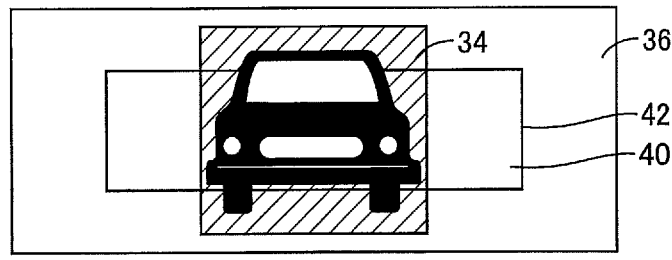
FIG. 3B is a view of an image taken when the following vehicle is located at a position $P_1$ in FIG. 3A.
Figure 3C:
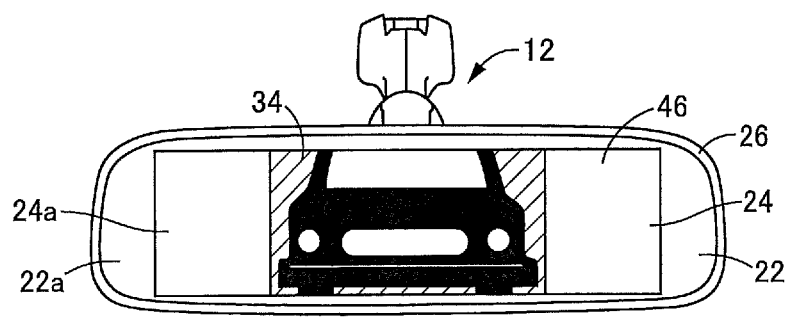
FIG. 3C is a view of a rear-side display device in a display showing state.
Figure 3D:
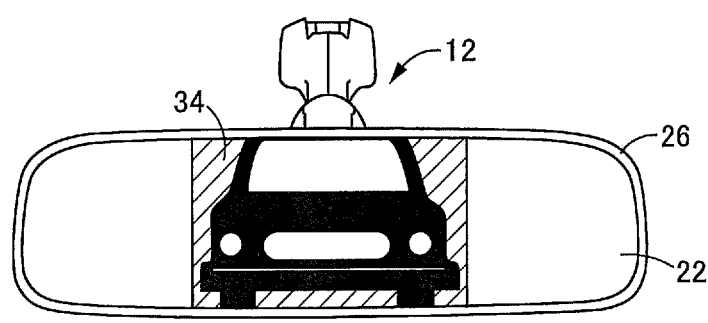
FIG. 3D is a view of the rear-side display device in a mirror-surface showing state.

There will be next explained an image processing executed by the controller 10. FIG. 3A is a view of an own vehicle 32 currently driving and a following vehicle 34 driving behind the own vehicle 32, with the own vehicle 32 and the following vehicle 34 viewed from above. FIG. 3B is a view of an image 36 taken by the camera 14 of the own vehicle 32 when the following vehicle 34 is located at a position $P_1$ in FIG. 3A. FIG. 3C is a view of the display 24 displaying a display image 46 created from the taken image 36. FIG. 3D is a view of an image that is to reflect in the mirror surface 22 of the own vehicle 32 when the following vehicle 34 is located at the position $P_1$ in FIG. 3A.

In FIG. 3A, boundary lines $X_1$ define a cutout area determined by an image-cutout angle $\theta_1$ of the camera 14 of the own vehicle 32. Boundary lines $X_2$ define a cutout area determined by an image-cutout angle $\theta_2$. Boundary lines $X_\alpha$ define a cutout area determined by an image-cutout angle $\theta\alpha$. Boundary lines Y indicated in the one-dot chain define an optical view area determined by an optic viewing angle φ (an optical field of view) of the mirror surface 22 of the own vehicle 32. The image-cutout angle determines the size of a cutout frame with respect to the image taken by the camera 14, that is, the image-cutout angle determines the size of a cutout image with respect to the taken image. Here, as illustrated in FIGS. 3A and 3B, the image-cutout angle is a value indicating an angle by which the cutout image as a portion of the taken image is cut out from the taken image with respect to the camera 14. A boundary between a portion of the taken image which is to be cut out as the cutout image and a portion of the taken image which is not to be cut out as the cutout image is defined by the boundary lines in FIG. 3A. Thus, the image-cutout angle is represented by an angle between two boundary lines extending from the camera 14. As illustrated in FIGS. 3A and 3B, since the boundary between the portion of the taken image which is to be cut out and the portion of the taken image which is not to be cut out is moved outward by a greater amount with increase in the image-cutout angle, the size of the cutout image with respect to the size of the taken image increases with increase in the image-cutout angle. In this increase, the size of the cutout frame increases with a constant aspect ratio. This aspect ratio is the same as that of the display 24.

The optical viewing angle φ (the optical field of view) indicates a portion of the view behind the vehicle 2, which portion reflects in the mirror surface 22. The optical viewing angle φ is represented by the angle between the two boundary lines Y extending from the mirror surface 22. Each of the boundary lines Y indicates a boundary between a portion of the view behind the vehicle 2 which reflects in the mirror surface 22 and a portion of the view behind the vehicle 2 which does not reflect in the mirror surface 22 when the driver of the own vehicle 32 views the mirror surface 22. That is, an object existing on an area between the two boundary lines $X_1$ is contained in a cutout image 40, and an object existing on an area between the two boundary lines Y reflects in the mirror surface 22 (see FIG. 3D). A distance between the own vehicle 32 and the following vehicle 34 located at the position $P_1$ is defined as a vehicle-to-vehicle distance $L_1$. A distance between the own vehicle 32 and the following vehicle 34 located at a position $P_2$ is defined as a vehicle-to-vehicle distance $L_2$. The following vehicle 34 located at the position $P_1$ is defined as the following vehicle 34 ($P_1$). The following vehicle 34 located at the position $P_2$ is defined as the following vehicle 34 ($P_2$).

The controller 10 determines the image-cutout angle based on a vehicle-to-vehicle distance between the own vehicle 32 and the following vehicle 34 and cuts out, as the cutout image, a portion of the taken image which is located within the cutout frame having the size corresponding to the determined image-cutout angle. The controller 10 then creates the display image from the cutout image such that the display image matches the size of the display 24. The controller 10 then displays the created display image on the display 24. The image-cutout angle is determined based on the vehicle-to-vehicle distance between the own vehicle 32 and the following vehicle 34. When the vehicle-to-vehicle distance is less than or equal to a set value LS, the controller 10 determines, as the image-cutout angle, an image-cutout angle calculated based on the vehicle-to-vehicle distance. When the vehicle-to-vehicle distance is greater than the set value LS, the controller 10 determines a predetermined set image-cutout angle $\theta_3$ as the image-cutout angle.

The set value LS is set in advance as a distance for which it is determined that there is no need to accurately grasp a sense of distance between the own vehicle 32 and the following vehicle 34 because the following vehicle 34 is sufficiently spaced apart from the own vehicle 32. The set image-cutout angle $\theta_3$ is set so as to be greater than the image-cutout angle $\theta\alpha$ that is such an image-cutout angle that the size of the following vehicle 34 displayed on the display 24 is equal to that of the following vehicle 34 that is to reflect in the mirror surface 22 when the distance between the own vehicle 32 and the following vehicle 34 is equal to the set value LS.

There will be explained the image processing executed by the controller 10 when the vehicle-to-vehicle distance between the own vehicle 32 and the following vehicle 34 is less than or equal to the set value LS. As illustrated in FIG. 3A, the camera 14 is provided at a rear of the rear-side display device 12, and in the case where the image-cutout angle is greater than the optical viewing angle φ, each of the boundary lines $X_1$ and a corresponding one of the boundary lines Y intersect each other at a position behind the own vehicle 32 by a certain distance, and likewise each of the boundary lines $X_2$ and a corresponding one of the boundary lines Y intersect each other at a position behind the own vehicle 32 by a certain distance. At each of the positions, the size of the cutout area and the size of the optical field area are equal to each other, and accordingly the size of the following vehicle 34 located at this position with respect to the cutout area is equal to that of the following vehicle 34 with respect to the optical field area. The cutout image cut out based on a cutout frame 42 determined by the image-cutout angle $\theta_1$ is changed in size so as to match the display region of the display 24 and displayed on the display 24.

In the case where the distance between the own vehicle 32 and the position at which each of the boundary lines $X_1$ and the corresponding one of the boundary lines Y intersect each other becomes equal to the vehicle-to-vehicle distance $L_1$ between the own vehicle 32 and the following vehicle 34 ($P_1$), the size of the cutout area becomes equal to that of the optical field area. Thus, the size of the following vehicle 34 ($P_1$) displayed on the display 24 is equal to that of the following vehicle 34 ($P_1$) reflecting in the mirror surface 22 in this case.

In the case where the following vehicle 34 is located at the position $P_1$, the controller 10 controls the display 24 to display the following vehicle 34 ($P_1$) with a size equal to that of the following vehicle 34 ($P_1$) that is to reflect in the mirror surface 22. Thus, the controller 10 determines the image-cutout angle to the image-cutout angle $\theta_1$ such that the distance between the own vehicle 32 and the position at which each of the boundary lines $X_1$ and the corresponding one of the boundary lines Y intersect each other is equal to the vehicle-to-vehicle distance $L_1$ between the own vehicle 32 and the following vehicle 34 ($P_1$). In the case where the following vehicle 34 is located at the position $P_2$, the controller 10 determines the image-cutout angle to the image-cutout angle $\theta_2$ at which each of the boundary lines $X_2$ and the corresponding one of the boundary lines Y intersect each other at the corresponding one of the positions $P_2$. As illustrated in FIG. 3A, the image-cutout $\theta_1$ determined when the vehicle-to-vehicle distance is the vehicle-to-vehicle distance $L_1$ is greater than the image-cutout angle $\theta_2$ determined when the vehicle-to-vehicle distance is the vehicle-to-vehicle distance $L_2$ that is greater than the vehicle-to-vehicle distance $L_1$. Accordingly, when the vehicle-to-vehicle distance is less than or equal to the set value LS, the controller 10 determines the image-cutout angle to such an image-cutout angle that increases with decrease in the vehicle-to-vehicle distance.

The controller 10 executes the image processing when the display switching switch 20 is in the ON state. When the display switching switch 20 is in the ON state, the camera 14 takes an image and outputs the taken image to the controller 10 each time when a specific length of time is elapsed. When the following vehicle 34 is located at the position $P_1$ in FIG. 3A, the controller 10 obtains the taken image 36 illustrated in FIG. 3B. The controller 10 then calculates the vehicle-to-vehicle distance $L_1$ between the own vehicle 32 and the following vehicle 34 based on a value detected by the radar 18. The controller 10 calculates the image-cutout angle $\theta_1$ based on the calculated vehicle-to-vehicle distance $L_1$ and a correlation, which will be explained below, between (i) a distance between the vehicle and a subject object (e.g., the following vehicle) and (ii) a value of the image-cutout angle. It is noted that the distance between the vehicle and the subject object may be hereinafter referred to as "spaced distance".

The correlation between the spaced distance and the image-cutout angle is preliminarily stored in the ROM of the controller 10 before shipment of the vehicle. There will be explained a method of calculating the correlation between the spaced distance and the image-cutout angle. First, a subject object is placed at a position spaced apart from the vehicle 2 at a predetermined distance. The camera 14 takes an image of this subject object. The controller 10 cuts out cutout images while changing the image-cutout angle, and measures the image-cutout angle at which the size of the subject object displayed on the display 24 is equal to the size of the subject object reflecting in the mirror surface 22. Based on this measurement, the image-cutout angle at the time point when the spaced distance between the vehicle 2 and the subject object is equal to the predetermined distance is obtained. Likewise, the controller 10 changes the spaced distance to various distances and obtains the image-cutout angles respectively corresponding thereto, whereby the correlation between the spaced distance and the image-cutout angle at the time point when the size of the subject object displayed on the display 24 is equal to that of the following vehicle reflecting in the mirror surface 22 can be obtained.

The image-cutout angle may be calculated using the vehicle-to-vehicle distance between the own vehicle 32 and the following vehicle 34, the distance between the camera 14 and the mirror surface 22, and a value of the optical viewing angle as illustrated in FIG. 3A. As illustrated in FIG. 3A, since the distance between the camera 14 and the mirror surface 22 and the size of the optical viewing angle $\varphi$ of the mirror surface 22 are determined in advance, obtaining the vehicle-to-vehicle distance between the own vehicle 32 and the following vehicle 34 enables the controller 10 to calculate the image-cutout angle. Even in the case where the image-cutout angle is calculated, the correlation between the vehicle-to-vehicle distance (the spaced distance) and the image-cutout angle may be preliminarily obtained by the above-described calculation before shipment of the vehicle 2, and this obtained correlation may be stored in the ROM of the controller 10. The controller 10 may determine the image-cutout angle by the above-described calculation each time when the vehicle-to-vehicle distance between the own vehicle 32 and the following vehicle 34 is obtained.

When the following vehicle 34 is located at the position $P_1$, the controller 10 sets the image-cutout angle to the image-cutout angle $\theta_1$ obtained based on the vehicle-to-vehicle distance $L_1$. In this case, the cutout frame is the cutout frame 42 having the size corresponding to the image-cutout angle $\theta_1$. The controller 10 then cuts out the cutout image 40 from the taken image 36 based on the cutout frame 42. The controller 10 executes a mirror-image processing for the cutout image 40 to create the display image 46 suitable for the size of the display 24. The controller 10 sends the display 24 a signal based on the display image 46 and displays the display image 46 on the display 24 as illustrated in FIG. 3C. With these processings, the following vehicle 34 ($P_1$) is displayed on the display 24 with the same size as that of the following vehicle 34 ($P_1$) that is to reflect in the mirror surface 22 illustrated in FIG. 3D. It is noted that when the following vehicle 34 is located at the position $P_2$, the controller 10 sets the image-cutout angle to the image-cutout angle $\theta_2$. Also in this case, though not illustrated, it is possible to display the following vehicle 34 ($P_2$) on the display 24 with the same size as that of the following vehicle 34 ($P_2$) that is to reflect in the mirror surface 22.

Figure 4A:
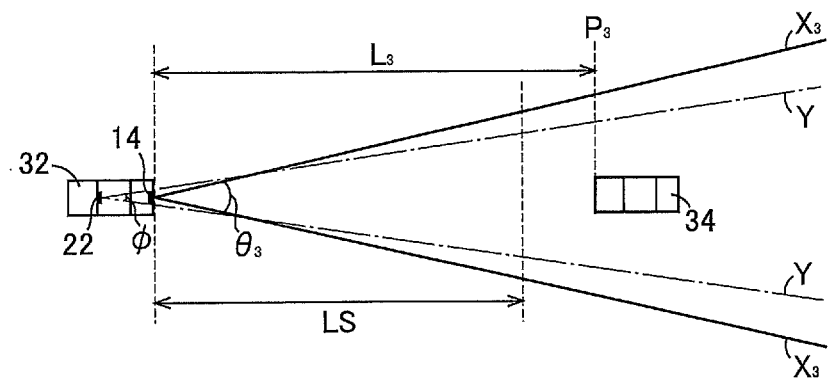
FIG. 4A is a view of the own vehicle and the following vehicle running on a rear side of the own vehicle, with the own vehicle and the following vehicle viewed from above.
Figure 4B:
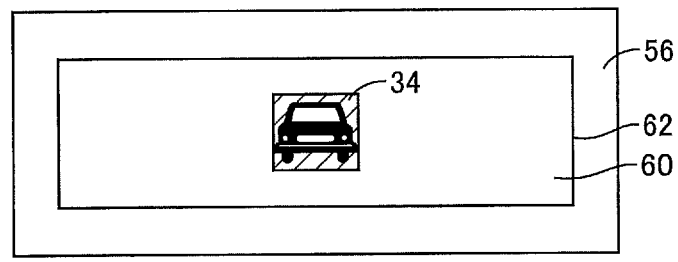
FIG. 4B is a view of an image taken when the following vehicle is located at a position $P_3$ in FIG. 4.
Figure 4C:
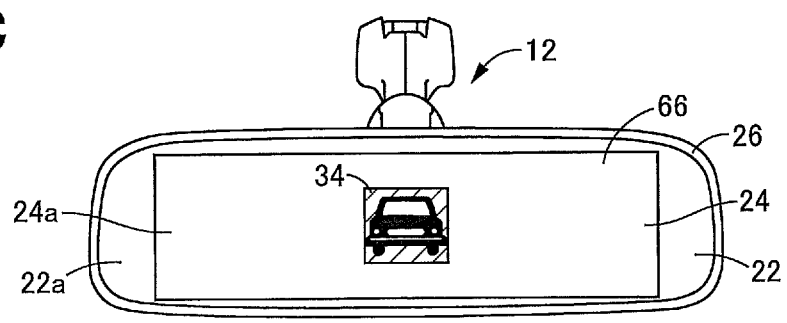
FIG. 4C is a view of the nearside display device in the display showing state.
Figure 4D:
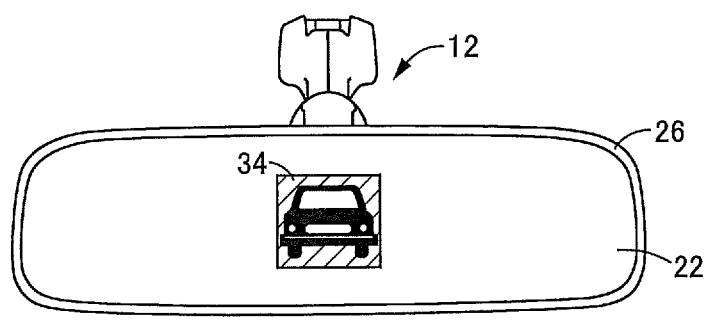
FIG. 4D is a view of the rear-side display device in the mirror-surface showing state.

There will be next explained the image processing executed by the controller 10 when the vehicle-to-vehicle distance between the own vehicle 32 and the following vehicle 34 is greater than the set value LS. FIG. 4A is a view of the own vehicle 32 currently driving and the following vehicle 34 driving at a position $P_3$ behind the own vehicle 32, with the own vehicle 32 and the following vehicle 34 viewed from above. FIG. 4B is a view of an image 56 taken by the camera 14 of the own vehicle 32 when the following vehicle 34 is located at the position $P_3$ in FIG. 4A. FIG. 4C is a view of the display 24 displaying a display image 66. FIG. 4D is a view of an image that is to reflect in the mirror surface 22 of the own vehicle 32 when the following vehicle 34 is located at the position $P_3$ in FIG. 4A. It is noted that the following vehicle 34 located at the position $P_3$ is defined as the following vehicle 31 ($P_3$).

In FIG. 4A, as in FIG. 3A, boundary lines $X_3$ define a cutout area determined by the set image-cutout angle $\theta_3$ of the camera 14 of the own vehicle 32. The boundary lines Y indicated by the one-dot chain lines define an optical field area determined by the optical viewing angle $\varphi$ of the mirror surface 22 of the own vehicle 32. That is, objects existing between the two boundary lines $X_3$ are contained in a cutout image 60, and objects existing in a region between the two boundary lines Y reflect in the mirror surface 22. The set image-cutout angle $\theta_3$ is set to be greater than the optical viewing angle $\varphi$. The vehicle-to-vehicle distance between the own vehicle 32 and the following vehicle 34 located at the position $P_3$ is defined as a vehicle-to-vehicle distance $L_3$. When the signal output from the display switching switch 20 is an ON signal, the controller 10 executes the image processing. When the signal output from the display switching switch 20 is the ON signal, the camera 14 takes an image and outputs the taken image to the controller 10 each time when the specific time is elapsed. When the following vehicle 34 is located at the position $P_3$ in FIG. 4A, the controller 10 obtains the taken image 56 illustrated in FIG. 4B.

The controller 10 then calculates the vehicle-to-vehicle distance $L_3$ between the own vehicle 32 and the following vehicle 34 ($P_3$) based on the value detected by the radar 18. The controller 10 then determines the image-cutout angle to the set image-cutout angle $\theta_3$ and cuts out the cutout image 60 based on a set cutout frame 62 having the site corresponding to the set image-cutout angle $\theta_3$. Here, the set image-cutout angle $\theta_3$ is a constant value regardless of the vehicle-to-vehicle distance in the case where the vehicle-to-vehicle distance is greater than the set value LS. As described above, the set image-cutout angle $\theta_3$ is greater than the image-cutout angle $\theta\alpha$ that is the angle when the vehicle-to-vehicle distance is equal to the set value LS. The controller 10 executes a mirror-image processing for the cutout image 60 to create the display image 66 suitable for the size of the display 24. The controller 10 outputs a signal based on the display image 66 to the display 24 to display the display image 66 on the display 24 as illustrated in FIG. 4C. As a result, the display 24 displays a view behind the own vehicle 32 which is broader than a view behind the own vehicle 32 which is to reflect in the mirror surface 22 when the image-cutout angle is equal to the image-cutout angle $\theta\alpha$.

As described above, when the vehicle-to-vehicle distance between the own vehicle 32 and the following vehicle 34 is less than or equal to the set value LS, the controller 10 determines the image-cutout angle to the image-cutout angle at which the size of the following vehicle 34 displayed on the display 24 is equal to that of the following vehicle 34 that is to reflect in the mirror surface 22. When the vehicle-to-vehicle distance between the own vehicle 32 and the following vehicle 34 is greater than the set value, the controller 10 determines the image-cutout angle to the set image-cutout angle $\theta_3$ that is greater than the image-cutout angle $\theta\alpha$.

Figure 5:
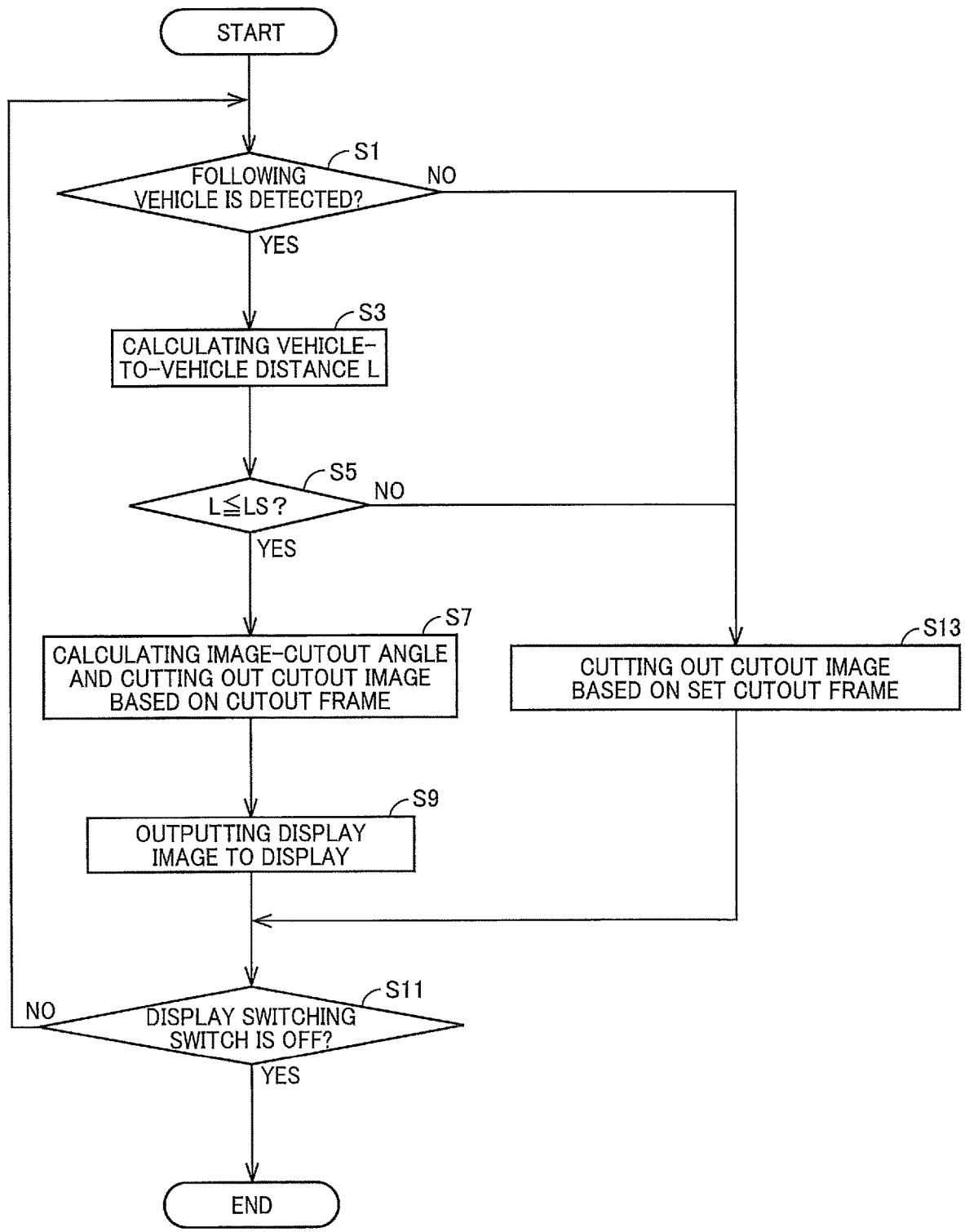
FIG. 5 is a flow chart illustrating an image cutout processing executed by the controller in the first embodiment.

There will be next explained the image cutout processing executed by the controller 10, with reference to the flow chart. FIG. 5 is a flow chart representing the image cutout processing executed by the controller 10. The flow in FIG. 5 begins when the display switching switch 20 becomes the ON state. At S1, the controller 10 determines whether a following vehicle behind the own vehicle 32 is detected, based on a value detected by the radar 18. When the following vehicle is detected, this flow goes to S3. When the following vehicle is not detected, this flow goes to S13. The controller 10 at S3 calculates a vehicle-to-vehicle distance L between the own vehicle 32 and the following vehicle 34 based on the value detected by the radar 18.

Figure 6:
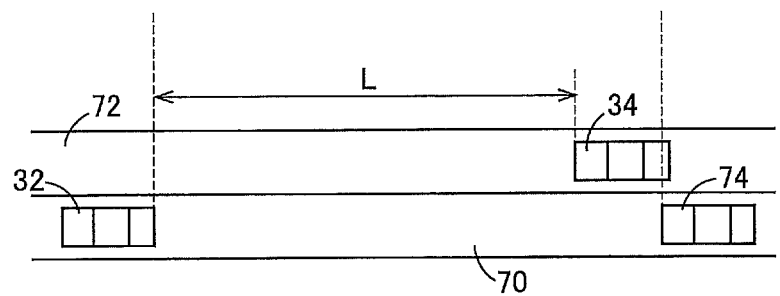
FIG. 6 is a view of the own vehicle and the following vehicles running on a rear side of the own vehicle, with the own vehicle and the following vehicles dewed from above.

Here, there will be explained the detection of the following vehicle and the calculation of the vehicle-to-vehicle distance. FIG. 6 is a view illustrating the own vehicle 32 driving on the lane 70 and a plurality of following vehicles driving behind the own vehicle 32, with the own vehicle 32 and the following vehicles viewed from above. As illustrated in FIG. 6, the following vehicle 34 is driving on the lane 72 next to the lane 70. A following vehicle 74 is driving on the lane 70. In this state, the vehicle-to-vehicle distance L between the own vehicle 32 and the following vehicle 34 in the longitudinal direction of the own vehicle 32 is less than the vehicle-to-vehicle distance between the own vehicle 32 and the following vehicle 74. Accordingly, the controller 10 uses a value of the vehicle-to-vehicle distance L between the own vehicle 32 and the following vehicle 34, for the image processing.

At S5, the controller 10 determines whether the vehicle-to-vehicle distance L calculated at S3 is less than or equal to the set value LS. When the vehicle-to-vehicle distance L is less than or equal to the set value LS, this flow goes to S7. When the vehicle-to-vehicle distance L is greater than the set value LS, this flow goes to S13. At S7, the controller 10 uses the correlation between (i) the distance between the vehicle and the subject object and (ii) the value of the image-cutout angle, to calculate the image-cutout angle corresponding to the vehicle-to-vehicle distance L calculated at S3. The controller 10 then sets the image-cutout angle to the calculated image-cutout angle. The controller 10 then cuts out the cutout image 40 from the taken image 36 based on the cutout frame 42 having the size corresponding to the set image-cutout angle.

At S9, the controller 10 executes a mirror-image processing for the cutout image to create the display image suitable for the size of the display region of the display 24. The controller 10 then outputs a signal based on the created display image to the display 24 to display the display image on the display 24. At S11, the controller 10 determines whether the display switching switch 20 becomes the OFF state. When the display switching switch 20 is not in the OFF state, this flow returns to S1. When the display switching switch 20 is in the OFF state, this flow ends. When a negative decision (NO) is made at S1 or S5, this flow goes to S13. At S13, the controller 10 sets the image-cutout angle to the set image-cutout angle $\theta_3$. The controller 10 then cuts out the cutout image 60 based on the set cutout frame 62 having the size corresponding to the set image-cutout angle $\theta_3$, and this flow goes to S9.

In the present embodiment as described above, the controller 10 obtains the vehicle-to-vehicle distance and, based on the vehicle-to-vehicle distance, determines the image-cutout angle at which the size of the following vehicle 34 displayed on the display 24 is actual to that of the following vehicle 34 that is to reflect in the mirror surface 22. This processing reduces the difference between the size of the following vehicle 34 displayed on the display 24 and the size of the following vehicle 34 that is to reflect in the mirror surface 22, thereby reducing difficulty for the driver in grasping the sense of distance between the own vehicle 32 and the following vehicle 34.

The display 24 is formed in a portion of the mirror surface 22 of the rear-side display device 12. Thus, the rear-side display device 12 is selectively in one of the display showing state and the mirror-surface showing state. In the present embodiment, for example, the image-cutout angle established when the vehicle-to-vehicle distance is the vehicle-to-vehicle distance $L_1$ is determined to the image-cutout angle $\theta_1$ at which the size of the following vehicle 34 ($P_1$) displayed on the display 24 is equal to that of the following vehicle 34 ($P_1$) that is to reflect in the mirror surface 22. As a result, when the display state of the rear-side display device 12 is switched, it is possible to reduce difficulty for the driver in grasping the sense of distance between the own vehicle 32 and the following vehicle 34.

In the present embodiment, the correlation between the image-cutout angle and the distance between the vehicle and the subject object when the size of the subject object displayed on the display 24 is equal to that of the subject object that is to reflect in the mirror surface 22 is calculated in advance. This configuration enables the controller 10 to determine the image-cutout angle by obtaining the vehicle-to-vehicle distance. As a result, it is possible to reduce a load imposed on the controller 10 for executing an image-cutout-angle calculation processing. In the present embodiment, the image-cutout angle $\theta_1$ established when the vehicle-to-vehicle distance is less than or equal to the set value, for example, when the vehicle-to-vehicle distance is the vehicle-to-vehicle distance $L_1$, is greater than the image-cutout angle $\theta_2$ established when the vehicle-to-vehicle distance is the vehicle-to-vehicle distance $L_2$ that is greater than the vehicle-to-vehicle distance $L_1$. Thus, the image-cutout angle is set to increase with decrease in the vehicle-to-vehicle distance. This configuration reduces the difference between the size of the following vehicle 34 displayed on the display 24 and she size of the following vehicle 34 that is to reflect in the mirror surface 22.

In the present embodiment, the image-cutout angle is determined to the set image-cutout angle $\theta_3$ when the vehicle-to-vehicle distance is less than or equal to the set value LS, that is, when the vehicle-to-vehicle distance is greater than the set value LS or when the vehicle-to-vehicle distance is not detectable. The set image-cutout angle $\theta_3$ is greater than the image-cutout angle established when the vehicle-to-vehicle distance is equal to the set value LS. Thus, when there is no need to accurately grasp the vehicle-to-vehicle distance between the own vehicle 32 and the following vehicle 34, the display 24 can display a view behind the own vehicle 32 which is broader than that reflecting in the mirror surface 22. Also, the set image-cutout angle $\theta_3$ is the predetermined fixed value. This configuration reduces the load imposed on the controller 10 for executing the image-cutout-angle calculation processing when the vehicle-to-vehicle distance is greater than the set value LS.

The controller 10 sets the image-cutout angle to the set image-cutout angle $\theta_3$ even when the following vehicle 34 is not detected, and the image-cutout angle cannot be determined based on the vehicle-to-vehicle distance. In the present embodiment, in the case where a plurality of following vehicles are present, the controller 10 obtains the vehicle-to-vehicle distance L between the own vehicle 32 and the following vehicle 34 that establishes the shortest vehicle-to-vehicle distance among the following vehicles. With this configuration, in the case where the following vehicle 34 is driving on the lane 72 different from the lane 70 on which the own vehicle 32 is driving, it is possible to reduce difficulty for the driver in grasping the sense of distance between the own vehicle 32 and the following vehicle 34 when the own vehicle 32 makes a lane change to the lane 72.

Second Embodiment

Figure 7:
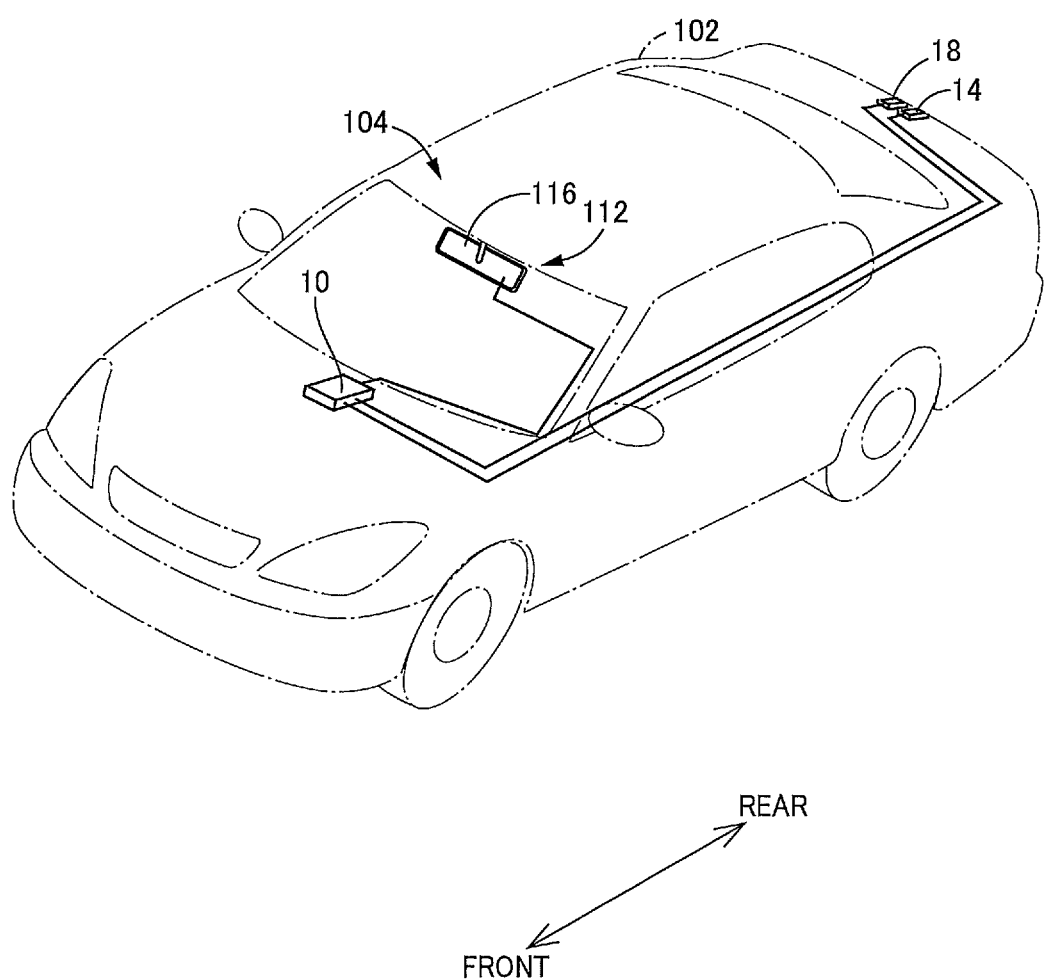
FIG. 7 is a view illustrating an overall construction of a vehicle installed with an image display device according to a second embodiment.

There will be next explained a second embodiment. While the image display device 4 according to the first embodiment includes the rear-side display device 12, the mirror surface 22 in the first embodiment is not included in an image display device 104 according to the second embodiment which is included in a rear-side display device 112 mounted on a vehicle 102. FIG. 7 is a view of the vehicle 102 in the second embodiment which is viewed from above. As illustrated in FIG. 7, the image display device 104 includes the controller 10, a rear-side display device 112, the camera 14, the radar 18, and a display 116. Since configurations of the controller 10, the camera 14, and the radar 18 are respectively the same as those of the controller 10, the camera 14, and the radar 18 in the first embodiment, an explanation thereof is dispensed with.

Figure 8:
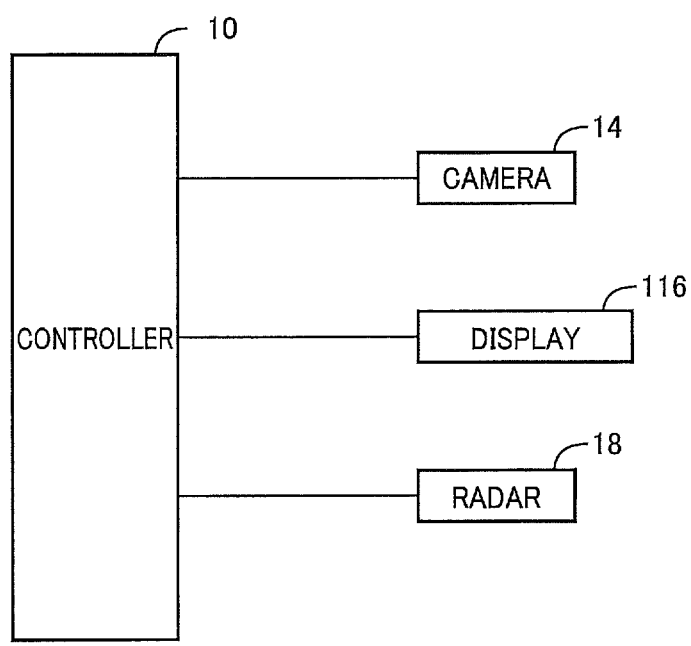
FIG. 8 is a schematic view illustrating electric connection of the controller in the second embodiment.

FIG. 8 is a view illustrating an overall configuration of the image display device 104. As illustrated in FIG. 8, the camera 14, the display 116, and the radar 18 are communicably connected to the controller 10. The controller 10 cuts out a portion of the image taken by the camera 14, creates the display image, and displays the created display image on the display 116. This image cutout processing is executed each time when a predetermined length of time is elapsed after an ignition switch of the vehicle 102 becomes an ON state. The image cutout processing will be described later in detail.

The rear-side display device 112 is mounted on the roof portion defining the passenger compartment. The roar-side display device 112 is disposed in front of the driver's seat and between the driver's seat and the assistant-driver's seat. The rear-side display device 12 includes the display 116. The display 116 displays the display image created by the controller 10, based on a signal output from the controller 10. When the ignition switch of the vehicle 102 is in the ON state, the controller 10 establishes an ON state of the display 116. When the ignition switch is in an OFF state, the controller 10 establishes an OFF state of the display 116. This configuration allows the driver to check a view behind the vehicle 102 by viewing the display 116.

Figure 9A:
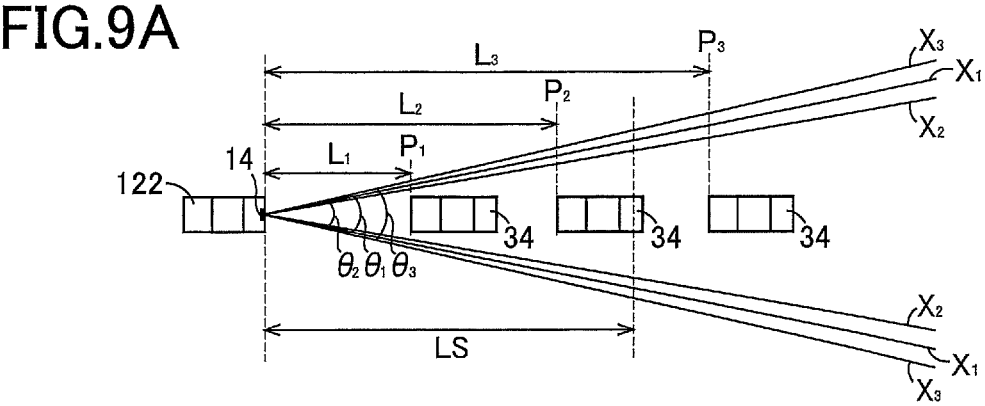
FIG. 9A is a view of an own vehicle and the following vehicles running on a rear side of the own vehicle, with the own vehicle and the following vehicles viewed from above.
Figure 9B:
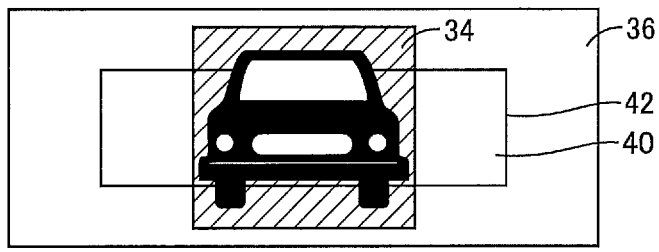
FIG. 9B is a view of an image taken when the following vehicle is located at a position $P_1$ in FIG. 9A.
Figure 9C:
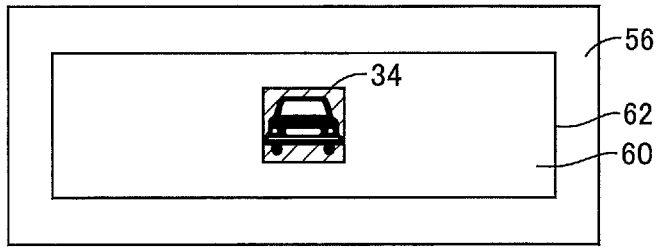
FIG. 9C is a view of an image taken when the following vehicle is located at a position $P_3$ in FIG. 9A.
Figure 9D:
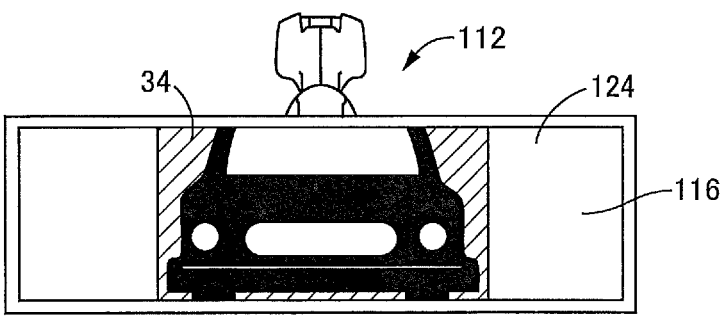
FIG. 9D is a view of the rear-side display device displaying a display image created from a taken image illustrated in FIG. 9B.
Figure 9E:
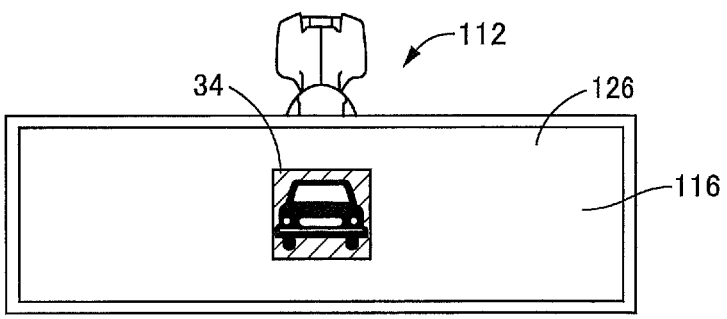
FIG. 9E is a view of the rear-side display device displaying a display image created from a taken image illustrated in FIG. 9C.

There will be next explained the image cutout processing executed by the controller 10. FIG. 9A is a view of an own vehicle 122 currently driving and the following vehicle 34 driving behind the own vehicle 122, with the own vehicle 122 and the following vehicle 34 viewed from above. FIG. 9B is a view of the taken image 36 when the following vehicle 34 is located at the position $P_1$ in FIG. 9A. FIG. 9C is a view of the taken image 56 when the following vehicle 34 is located at the position $P_3$ in FIG. 9A. FIG. 9D is a view of the display 116 displaying a display image 124 created from the taken image 36. FIG. 9E is a view of the display 116 displaying a display image 126 created from the taken image 36.

In FIG. 9A, the boundary lines $X_1$ define a cutout area determined by the image-cutout angle $\theta_1$ of the camera 14 of the own vehicle 122. The boundary lines $X_2$ define a cutout area determined by the image-cutout angle $\theta_2$. The boundary lines $X_3$ define a cutout area determined by the set image-cutout angle $\theta_3$. The image-cutout angle determines the size of the cutout frame with respect to the image taken by the camera 14, that is, the image-cutout angle determines the size of the cutout image with respect to the size of the taken image. The size of the cutout frame with respect to the image-cutout angle is determined by a correlation therebetween. Since the size of the cutout frame increases with increase in the image-cutout angle, the size of the cutout image with respect to the size of the taken image increases with increase in the image-cutout angle. In this increase, the size of the cutout frame increases with a constant aspect ratio.

The object existing between the two boundary lines $X_1$ is displayed on the display 116 as illustrated in FIG. 9D. The object existing between the two boundary lines $X_3$ is displayed on the display 116 as illustrated in FIG. 9E. The following vehicle 34 located at the position $P_1$ is defined as the following vehicle 34 ($P_1$). The following vehicle 34 located at the position $P_2$ is defined as the following vehicle 34 ($P_2$). The following vehicle 34 located at the position $P_3$ is defined as the following vehicle 34 ($P_3$). A distance between the own vehicle 122 and the following vehicle 34 ($P_1$) is defined as the vehicle-to-vehicle distance $L_1$. A distance between the own vehicle 122 and the following vehicle 34 ($P_2$) is defined as the vehicle-to-vehicle distance $L_2$. A distance between the own vehicle 122 and the following vehicle 34 ($P_3$) is defined as the vehicle-to-vehicle distance $L_3$.

When the vehicle-to-vehicle distance is less than or equal to the set value LS, the controller 10 determines the image-cutout angle based on the vehicle-to-vehicle distance between the own vehicle 122 and the following vehicle 34 and cuts out, as the cutout image, a portion of the taken image which is located within the cutout frame having the size corresponding to the determined image-cutout angle. When the vehicle-to-vehicle distance is greater than the set value LS, the controller 10 sets the image-cutout angle to the set image-cutout angle $\theta_3$ and cuts out, as the cutout image, a portion of the taken image which is located within the set cutout frame 62 having the size corresponding to the set image-cutout angle $\theta_3$. The controller 10 then creates the display image from the cutout image and displays the created display image on the display 24.

The set value LS is a distance for which it is determined that there is no need to accurately grasp a sense of distance between the own vehicle 32 and the following vehicle 34 because the following vehicle 34 is sufficiently spaced apart from the own vehicle 122. Assuming that the rear-side display device 112 has a mirror surface, the set image-cutout angle $\theta_3$ is set to be greater than the image-cutout angle $\theta\alpha$ that is such an image-cutout angle that the size of the following vehicle 34 displayed on the display 24 is equal to that of the following vehicle 34 that is to reflect in the mirror surface when the vehicle-to-vehicle distance between the own vehicle 122 and the following vehicle 34 is equal to the set value LS.

There will be next explained the image cutout processing executed by the controller 10 when the vehicle-to-vehicle distance is less than or equal to the set value LS. When the ignition switch of the vehicle 102 is in the ON state, the controller 10 executes the image processing. The camera 14 takes an image and outputs the taken image to the controller 10 each time when the specific time is elapsed. When the following vehicle 34 is located at the position $P_1$ in FIG. 9A, the controller 10 obtains the taken image 36 illustrated in FIG. 9B. The controller 10 then calculates the vehicle-to-vehicle distance $L_1$ between the own vehicle 122 and the following vehicle 34 ($P_1$) in FIG. 9A based on the value detected by the radar 18. When the calculated vehicle-to-vehicle distance $L_1$ is less than or equal to the set value LS, the controller 10 calculates the image-cutout angle $\theta_1$ based on the vehicle-to-vehicle distance $L_1$ and the correlation between (i) the distance (i.e., the spaced distance) between the vehicle and the subject object and (ii) the value of the image-cutout angle. It noted that the correlation between the spaced distance and the image-cutout angle is the same as that in the first embodiment.

Assuming that the rear-side display device 112 has a mirror surface, when the vehicle-to-vehicle distance is the vehicle-to-vehicle distance $L_1$, the controller 10 sets the image-cutout angle to the image-cutout angle $\theta_1$ at which the size of the following vehicle 34 ($P_1$) that is to reflect in the mirror surface is equal to that of the following vehicle 34 ($P_1$) displayed on the display 116. The controller 10 then cuts out the cutout image 40 from the taken image 36 based on the cutout frame 42 having the size corresponding to the image-cutout angle $\theta_1$. The controller 10 executes a mirror-image processing for the cutout image 40 to create the display image 124 suitable for the size of the display 116. When a signal based on the display image 124 is output to the display 116, as illustrated in FIG. 9C, the controller 10 displays the display image 124 on the display 116. In the case where the image-cutout angle is constant regardless of the vehicle-to-vehicle distance, when the vehicle-to-vehicle distance $L_1$ is a small value, the size of the following vehicle ($P_1$) displayed on the display 24 is in some cases larger than that of the following vehicle 34 ($P_1$) that is to reflect in the mirror surface. In the present embodiment, in contrast, the controller 10 adjusts the image-cutout angle based on the vehicle-to-vehicle distance. This processing reduces a difference between the size of the following vehicle 34 ($P_1$) displayed on the display 116 and the size of the following vehicle 34 ($P_1$) that is to reflect in the mirror surface when it is assumed that the rear-side display device 112 has the mirror surface.

It is noted that when the following vehicle 34 is located at the position $P_2$, as in the first embodiment, the controller 10 sets the image-cutout angle to the image-cutout angle $\theta_2$ that is less than the image-cutout angle $\theta_1$. Also in this case, though not illustrated, it is possible to reduce a difference between the size of the following vehicle 34 ($P_2$) displayed on the display 116 and the size of the following vehicle 34 ($P_2$) that is to reflect in the mirror surface when it is assumed that the rear-side display device 112 has the mirror surface. In view of the above, the image-cutout angle established when the vehicle-to-vehicle distance between the own vehicle 122 and the following vehicle 34 is the vehicle-to-vehicle distance $L_1$ is set to be greater than the image-cutout angle established when the vehicle-to-vehicle distance is the vehicle-to-vehicle distance $L_2$ that is greater than the vehicle-to-vehicle distance $L_1$.

There will be next explained the image cutout processing executed by the controller 10 when the vehicle-to-vehicle distance is greater than the set value LS. When the ignition switch of the vehicle 102 is in the ON state, the controller 10 executes the image processing. The camera 14 takes an image and outputs the taken image to the controller 10 each time when the specific time is elapsed. When the following vehicle 34 is located at the position $P_3$ in FIG. 9A, the controller 10 obtains the taken image 56 illustrated in FIG. 9C.

The controller 10 calculates the vehicle-to-vehicle distance $L_3$ between the own vehicle 122 and the following vehicle 31 ($P_3$) in FIG. 9A based on the value detected by the radar 18. In the case where the calculated vehicle-to-vehicle distance $L_3$ is greater than the set value LS, the controller 10 sets the image-cutout angle to the set image-cutout angle $\theta_3$. The controller 10 then cuts out the cutout image 60 based on the set cutout frame 62 having the size corresponding to the set image-cutout angle $\theta_3$. The controller 10 creates the display image 126 from the cutout image 60 and displays the created display image 126 on the display 116. As a result, the display 116 displays the following vehicle 34 ($P_3$) with a size smaller than a size of the following vehicle 34 ($P_3$) (see FIG. 4D) that is to reflect in the mirror surface when it is assumed that the rear-side display device 112 has the mirror surface. That is, the display 116 displays a rear-side view behind the own vehicle 122 which is broader than a rear-side view that is to reflect in the mirror surface when it is assumed that the rear-side display device 112 has the mirror surface.

As described above, the controller 10 adjusts the image-cutout angle based on the vehicle-to-vehicle distance when the vehicle-to-vehicle distance between the own vehicle 122 and the following vehicle 34 is less than or equal to the set value LS, and the controller 10 determines the image-cutout angle to the set image-cutout angle $\theta_3$ regardless of the vehicle-to-vehicle distance when the vehicle-to-vehicle distance is greater than the set value LS.

Figure 10:
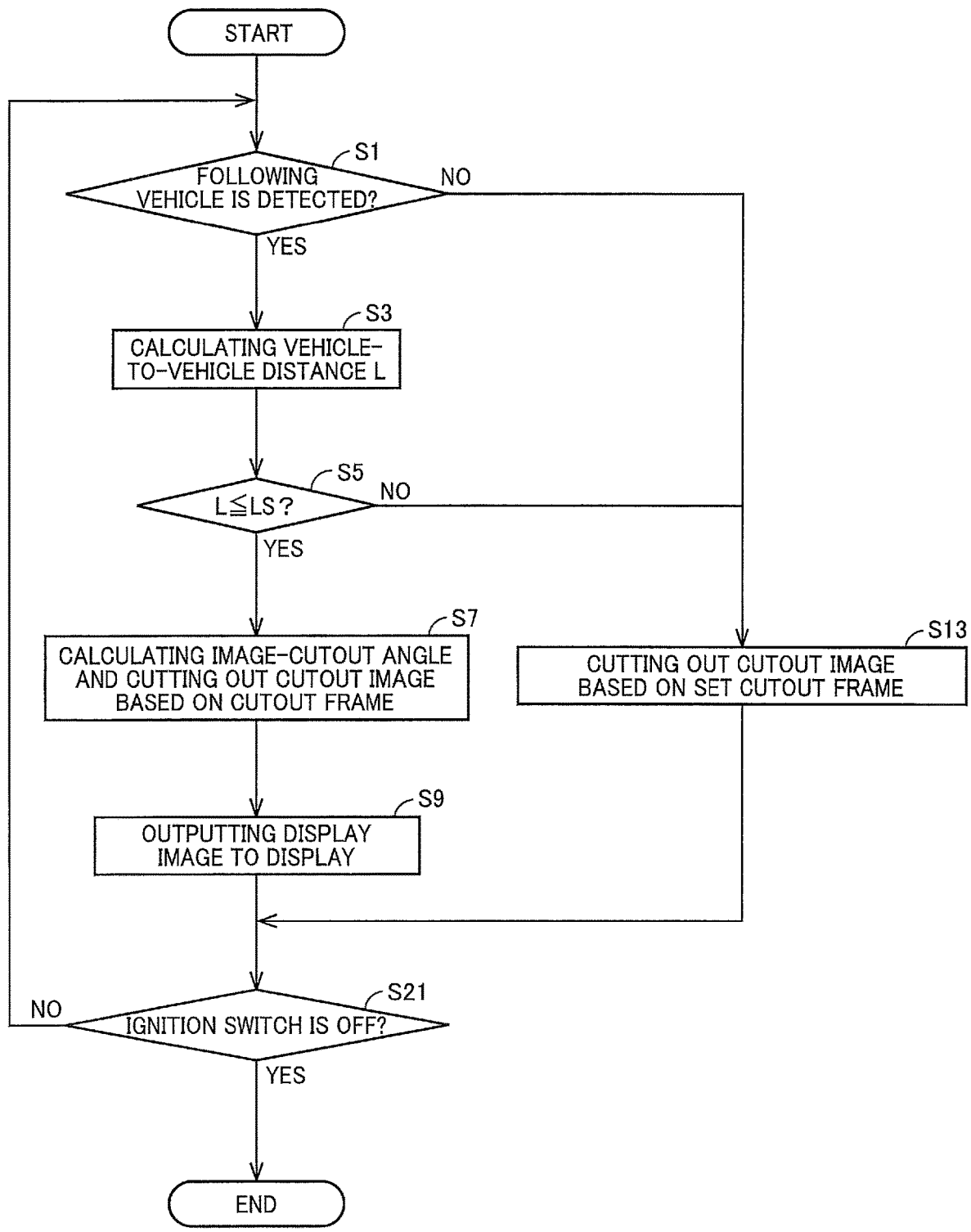
FIG. 10 is a flow chart illustrating an image processing executed by the controller in the second embodiment.

There will be next explained the image cutout processing executed by the controller 10, with reference to the flow chart FIG. 10 is a flow chart representing the image cutout processing executed by the controller 10. The flow in FIG. 10 begins when the ignition switch of the vehicle 102 becomes the ON state. First, the controller 10 executes the processing at S1. When the following vehicle is detected at S1, this flow goes to S3. When the following vehicle is not detected at S1, this flow goes to S33. At S3, the controller 10 calculates the vehicle-to-vehicle distance L between the own vehicle 122 and the following vehicle 34. The controller 10 then executes the processing at S5. When the vehicle-to-vehicle distance L is less than or equal to the set value LS, this flow goes to S7. When the vehicle-to-vehicle distance L is greater than the set value LS, this flow goes to S33.

At S7, the controller 10 cuts out the cutout image from the taken image based on the image-cutout angle that is calculated based on the vehicle-to-vehicle distance L. At S9, the controller 10 creates the display image from the cutout image and displays the created display image on the display 116. At S21, the controller 10 determines whether the ignition switch of the vehicle 102 is in an OFF state. When the ignition switch is not in the OFF state, this flow returns to S1. When the ignition switch is in the OFF state, this flow ends. When a negative decision (NO) is made at S1 or S5, this flow goes to S13. At S13, the controller 10 sets the image-cutout angle to the set image-cutout angle $\theta_3$ and cuts out the cutout image based on the set image-cutout angle $\theta_3$, and this flow goes to S9.

In the present embodiment as described above, when the vehicle-to-vehicle distance L is less than or equal to the set value LS, the image-cutout angle is set so as to reduce a difference between the size of the following vehicle 34 ($P_1$) displayed on the display 116 and the size of the following vehicle 34 ($P_1$) that is to reflect in the mirror surface when it is assumed that the rear-side display device 112 has the mirror surface. This configuration enables the display 116 to display the following vehicle 34 ($P_1$) with a size near the size of the following vehicle 34 ($P_1$) that is to reflect in the mirror surface when it is assumed that the rear-side display device 112 has the mirror surface. Accordingly, it is possible to reduce difficulty for the driver in grasping a sense of distance between the own vehicle 122 and the following vehicle ($P_1$).

In the present embodiment, when the vehicle-to-vehicle distance. L is greater than the set value LS, the controller 10 sets the image-cutout angle to the set image-cutout angle $\theta_3$ that is greater than the image-cutout angle $\theta\alpha$. This configuration enables the display 110 to display a rear-side view behind the own vehicle 122 which is broader than a rear-side view displayed when the image-cutout angle is equal to the image-cutout angle $\theta\alpha$.

In the present embodiment, even in the case where the following vehicle 34 is not detected, and thereby the controller 10 cannot calculate the vehicle-to-vehicle distance L, the controller 10 creates the display image based on the set image-cutout angle $\theta_3$ that is greater than the image-cutout angle $\theta\alpha$. Thus, in the case where the following vehicle 34 is not detected, the display 116 can display a rear-side view behind the own vehicle 122 which is broader than a rear-side view displayed when the image-cutout angle is equal to the image-cutout angle $\theta\alpha$.

In the first and second embodiments, each of the taken images 36, 56 is one example of a rear-view image, and the radar 18 is one example of a distance obtainer. The image-cutout angle is one example of a view-angle value, and the set value LS is one example of a set value. The controller 10 configured to execute the processings at S7 and S13 is one example of a cutout-image creator. The controller 10 configured to execute the processing at S9 is one example of a display controller. The image-cutout angle $\theta\alpha$ is one example of a first view-angle value. The mirror surface portion 24a is one example of a first mirror surface portion. The mirror surface portion 22a is one example of a second mirror surface portion. The vehicle-to-vehicle distance $L_1$ in FIGS. 3A and 9A is one example of a first distance. The vehicle-to-vehicle distance $L_2$ in FIGS. 3A and 9A is one example of a second distance.

While the embodiments have been described above, it is to be understood that the disclosure is not limited to the details of the illustrated embodiments, but may be embodied with various changes and modifications, which may occur to those skilled in the art, without departing from the spirit and scope of the disclosure. In the first and second embodiments, the vehicle-to-vehicle distance between the own vehicle and the following vehicle is obtained based on the value detected by the radar 18, but the present disclosure is not limited to this configuration. For example, the vehicle-to-vehicle distance between the own vehicle and the following vehicle may be obtained via communication between these vehicles. In the first and second embodiments, the controller 10 sets the set value LS and when the vehicle-to-vehicle distance is greater than the set value LS, the image cutout processing is executed based on the set image-cutout angle $\theta_3$, but the present disclosure is not limited to this configuration. For example, the controller 10 may determine the image-cutout angle to an appropriate value based on the vehicle-to-vehicle distance in each of all the vehicle-to-vehicle distances without setting the set value LS.

What is claimed is:

1. An image display device, comprising:
a camera configured to take an image representing a view behind a vehicle;
a rear-view-image display unit comprising (i) a mirror surface configured to reflect a view behind the vehicle and (ii) a display configured to display at least a portion of a rear-view image taken by the camera, the rear-view-image display unit being switchable between a mirror-surface showing state in which the view behind the vehicle reflects in the mirror surface and a display showing state in which the view behind the vehicle is displayed on the display;
a distance obtainer configured to obtain a vehicle-to-vehicle distance between the vehicle and a following vehicle located behind the vehicle;
a cutout-image creator configured to cut out a cutout image based on a view-angle value, the cutout image being a portion of the rear-view image taken by the camera, the view-angle value indicating a size of the cutout image with respect to a size of the rear-view image; and
a display controller configured to create a display image based on the cutout image such that the display image matches a size of a display region of the display, the display controller being configured to control the display to display the created display image on the display region of the display,
wherein the cutout-image creator is configured to, based on the vehicle-to-vehicle distance obtained by the distance obtainer and a distance between the mirror surface and the camera, determine, when the vehicle-to-vehicle distance obtained by the distance obtainer is less than or equal to a set value, the view-angle value to such a view-angle value that a size of the following vehicle to be displayed on the display image is equal to a size of the following vehicle that is to reflect in the mirror surface,
wherein the cutout-image creator is configured to, when the obtained vehicle-to-vehicle distance is less than or equal to the set value, determine the view-angle value to such a view-angle value that the view-angle value increases with a decrease in the vehicle-to-vehicle distance, and
wherein the display controller is configured not to display the display image based on the cutout image in a period from a first timing when the rear-view-image display unit is switched from the mirror-surface showing state to the display showing state and the following vehicle is detected to a second timing when the distance obtainer obtains the vehicle-to-vehicle distance and the cutout-image creator cuts out the cutout image based on the obtained vehicle-to-vehicle distance, and is configured to display the display image after the cutout-image creator cutouts the image based on the obtained vehicle-to-vehicle distance.

2. The image display device according to claim 1, wherein the display is formed on the mirror surface, wherein the mirror surface comprises: a first mirror surface portion formed on a surface of the display; and a second mirror surface portion disposed around the first mirror surface portion, and
wherein the rear-view-image display unit is switchable between (i) the mirror-surface showing state in which the view behind the vehicle reflects in the first mirror surface portion and the second mirror surface portion and (ii) the display showing state in which the view behind the vehicle is displayed on the display.

3. The image display device according to claim 2, wherein the view-angle value that establishes a state in which a size of the following vehicle displayed in the display showing state is equal to a size of the following vehicle that is to reflect in the mirror-surface showing state is determined based on the vehicle-to-vehicle distance and the distance between the mirror surface and the camera,
wherein the cutout-image creator is configured to determine the view-angle value based on the vehicle-to-vehicle distance obtained by the distance obtainer and the distance between the mirror surface and the camera, and create the cutout image based on the determined view-angle value.

4. The image display device according to claim 1, wherein the cutout-image creator is configured to, when the vehicle-to-vehicle distance obtained by the distance obtainer is greater than the set value, determine the view-angle value to a view-angle value greater than a first view-angle value that is such a view-angle value that the size of the following vehicle to be displayed on the display is equal to the size of the following vehicle that is to reflect in the mirror surface when the vehicle-to-vehicle distance is equal to the set value.

5. The image display device according to claim 1,
wherein the cutout-image creator is configured to, when the vehicle-to-vehicle distance is greater than the set value, determine the view-angle value to a preset view-angle value greater than a first view-angle value that is such a view-angle value that the size of the following vehicle to be displayed on the display is equal to the size of the following vehicle that is to reflect in the mirror surface when the vehicle-to-vehicle distance is equal to the set value, and
wherein the preset view-angle value is constant regardless of the vehicle-to-vehicle distance.

6. The image display device according to claim 1, wherein the cutout-image creator is configured to, when the following vehicle is not detected, create the cutout image based on a preset view-angle value greater than a first view-angle value that is such a view-angle value that the size of the following vehicle to be displayed on the display is equal to the size of the following vehicle that is to reflect in the mirror surface when the vehicle-to-vehicle distance is equal to the set value.

7. The image display device according to claim 1, wherein the distance obtainer is configured to obtain, as the vehicle-to-vehicle distance, a vehicle-to-vehicle distance between the vehicle and the following vehicle nearest to the vehicle among a plurality of following vehicles located behind the vehicle.

8. An image display device, comprising:
a camera configured to take an image representing a view behind a vehicle;
a rear-view-image display unit comprising a display configured to display at least a portion of a rear-view image taken by the camera, the rear-view-image display unit being switchable between (i) a mirror-surface showing state in which the view behind the vehicle reflects in a mirror surface and (ii) a display showing state in which the view behind the vehicle is displayed on the display;
a distance obtainer configured to obtain a vehicle-to-vehicle distance between the vehicle and a following vehicle located behind the vehicle;
a cutout-image creator configured to cut out a cutout image based on a view-angle value, the cutout image being a portion of the rear-view image taken by the camera, the view-angle value indicating a size of the cutout image with respect to a size of the rear-view image; and
a display controller configured to create a display image based on the cutout image such that the display image matches a size of a display region of the display, the display controller being configured to control the display to display the created display image on the display region of the display,
wherein the cutout-image creator is configured to determine the view-angle value based on the vehicle-to-vehicle distance obtained by the distance obtainer and a distance between the display and the camera,
wherein the cutout-image creator is configured to determine the view-angle value such that a view-angle value taken when the vehicle-to-vehicle distance obtained by the distance obtainer is a first distance is greater than a view-angle value taken when the vehicle-to-vehicle distance is a second distance that is greater than the first distance,
wherein the cutout-image creator is configured to, when the vehicle-to-vehicle distance obtained by the distance obtainer is less than or equal to a set value, determine the view-angle value to such a view-angle value that the view-angle value increases with a decrease in the vehicle-to-vehicle distance, and
wherein the display controller is configured not to display the image based on the cutout image in a period from a first timing when the rear-view-image display unit is switched from the mirror-surface showing state to the display showing state and the following vehicle is detected to a second timing when the distance obtainer obtains the vehicle-to-vehicle distance and the cutout-image creator cuts out the cutout image based on the obtained vehicle-to-vehicle distance, and is configured to display the display image after the cutout-image creator cutouts the image based on the obtained vehicle-to-vehicle distance.

9. An image display device, comprising:
a camera configured to take an image representing a view behind a vehicle;
a rear-view-image display unit comprising (i) a mirror surface configured to reflect a view behind the vehicle and (ii) a display configured to display at least a portion of a rear-view image taken by the camera, the rear-view-image display unit being switchable between a mirror-surface showing state in which the view behind the vehicle reflects in the mirror surface and a display showing state in which the view behind the vehicle is displayed on the display;

a distance obtainer configured to obtain a vehicle-to-vehicle distance between the vehicle and a following vehicle located behind the vehicle;

a cutout-image creator configured to cut out a cutout image based on a view-angle value, the cutout image being a portion of the rear-view image taken by the camera, the view-angle value indicating a size of the cutout image with respect to a size of the rear-view image; and a display controller configured to create a display image based on the cutout image such that the display image matches a size of a display region of the display, the display controller being configured to control the display to display the created display image on the display region of the display, wherein the cutout-image creator is configured to, based on the vehicle-to-vehicle distance obtained by the distance obtainer, determine, when the vehicle-to-vehicle distance obtained by the distance obtainer is less than or equal to a set value, the view-angle value to such a view-angle value that a size of the following vehicle to be displayed on the display image is equal to a size of the following vehicle that is to reflect in the mirror surface, wherein the cutout-image creator is configured to, when the vehicle-to-vehicle distance obtained by the distance obtainer is less than or equal to a set value, determine the view-angle value to such a view-angle value that the view-angle value increases with a decrease in the vehicle-to-vehicle distance, wherein the cutout-image creator is configured to, when the vehicle-to-vehicle distance is greater than the set value, determine the view-angle value to a view-angle value greater than a first view-angle value that is such a view-angle value that the size of the following vehicle to be displayed on the display is equal to the size of the following vehicle that is to reflect in the mirror surface when the vehicle-to-vehicle distance is equal to the set value, and wherein the display controller is configured not to display the image based on the cutout image in a period from a first timing when the rear-view-image display unit is switched from the mirror-surface showing state to the display showing state and the following vehicle is detected to a second timing when the distance obtainer obtains the vehicle-to-vehicle distance and the cutout-image creator cuts out the cutout image based on the obtained vehicle-to-vehicle distance, and is configured to display the display image after the cutout-image creator cutouts the image based on the obtained vehicle-to-vehicle distance.

10. The image display device according to claim 9, wherein the display is formed on the mirror surface, wherein the mirror surface comprises: a first mirror surface portion formed on a surface of the display; and a second mirror surface portion disposed around the first mirror surface portion, and wherein the rear-view-image display unit is switchable between (i) the mirror-surface showing state in which the view behind the vehicle reflects in the first mirror surface portion and the second mirror surface portion and (ii) the display showing state in which the view behind the vehicle is displayed on the display.

11. The image display device of claim 9, wherein the view-angle value greater than the first view-angle value comprises a preset view-angle value that is constant regardless of the vehicle-to-vehicle distance.

12. The image display device of claim 9, wherein the cutout-image creator is configured to, when the following vehicle is not detected, create the cutout image based on the determined view-angle value.

13. The image display device according to claim 9, wherein the distance obtainer is configured to obtain, as the vehicle-to-vehicle distance, a vehicle-to-vehicle distance between the vehicle and the following vehicle nearest to the vehicle among a plurality of following vehicles located behind the vehicle.

* * * * *

UNITED STATES PATENT AND TRADEMARK OFFICE
CERTIFICATE OF CORRECTION

PATENT NO. : 10,744,877 B2
APPLICATION NO. : 15/864652
DATED : August 18, 2020
INVENTOR(S) : Takumi Kochiya It is certified that error appears in the above-identified patent and that said Letters Patent is hereby corrected as shown below:

On the Title Page

Item (72), inventor 1, city, delete "Nisshin" and insert --Nisshin-shi Aichi-ken--, therefor.

In the Specification

In Column 3, Line 7, delete "re ion" and insert --region--, therefor.

In Column 3, Line 63, delete "switcheable" and insert --switchable--, therefor.

In Column 4, Line 52, delete "sue" and insert --size--, therefor.

In Column 5, Line 21, delete "create a" and insert --creator--, therefor.

In Column 7, Line 60, delete "rears de" and insert --rear-side--, therefor.

In Column 10, Line 65, after "image-cutout", insert --angle--.

In Column 12, Line 38, delete "31" and insert --34--, therefor.

In Column 14, Line 26, delete "actual" and insert --equal--, therefor.

In Column 15, Line 1, delete "she" and insert --the--, therefor.

In Column 15, Line 65, delete "roar-side" and insert --rear-side--, therefor.

In Column 18, Line 28, delete "31" and insert --34--, therefor.

In Column 19, Line 30, after "distance", delete ".".

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*

In Column 19, Line 33, delete "110" and insert --116--, therefor.

In Column 20, Line 9, after "LS", insert --,--, therefor.